(12) United States Patent
von Tardy-Tuch et al.

(10) Patent No.: US 9,545,819 B2
(45) Date of Patent: Jan. 17, 2017

(54) VEHICLE WHEEL RIM

(71) Applicant: Dr. Ing. h.c. F. Porsche Aktiengesellschaft, Stuttgart (DE)

(72) Inventors: Georg von Tardy-Tuch, Kapfenhardt (DE); Achim Schulz, Niefern-Oeschelbronn (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/418,731

(22) PCT Filed: Jul. 6, 2013

(86) PCT No.: PCT/EP2013/002000
§ 371 (c)(1),
(2) Date: Jan. 30, 2015

(87) PCT Pub. No.: WO2014/019640
PCT Pub. Date: Feb. 6, 2014

(65) Prior Publication Data
US 2015/0174955 A1 Jun. 25, 2015

(30) Foreign Application Priority Data
Aug. 1, 2012 (DE) .......... 10 2012 107 019

(51) Int. Cl.
*B60B 21/10* (2006.01)
*B60B 3/02* (2006.01)
*B60B 21/02* (2006.01)

(52) U.S. Cl.
CPC ............. *B60B 21/106* (2013.01); *B60B 3/02* (2013.01); *B60B 21/021* (2013.01);
(Continued)

(58) Field of Classification Search
CPC ........ B60B 21/106; B60B 21/021; B60B 3/02; B60B 21/026; B60B 21/104; B60B 2900/523; B60B 2900/111; B60B 21/10
(Continued)

(56) References Cited

U.S. PATENT DOCUMENTS 5,794,340 A * 8/1998 Pollkotter ............ B21D 53/264
29/894.324
6,318,446 B1 11/2001 Nichols
(Continued)

FOREIGN PATENT DOCUMENTS

CH 676105 12/1990
DE 19533612 3/1997
(Continued)

OTHER PUBLICATIONS

German Search Report for German Application No. 10 2012 107 019.9 mailed Apr. 30, 2013, with partial translation.
(Continued)

*Primary Examiner* — S. Joseph Morano
*Assistant Examiner* — Jean Charleston
(74) *Attorney, Agent, or Firm* — RatnerPrestia

(57) ABSTRACT

A vehicle wheel rim for use on a motor vehicle, having a wheel rim well (1, 29), having an inner wheel rim flange (7, 30) and having an outer wheel rim flange, wherein the wheel rim well (1, 29) is delimited at its axial end regions by in each case one of the wheel rim flanges (7, 30), wherein the wheel rim flanges (7, 30) are formed by a radially encircling wall, said walls extending in each case at a predefinable angle (5, 27) with respect to the wheel rim well (1, 29).

4 Claims, 1 Drawing Sheet

(52) U.S. Cl.
CPC .......... *B60B 21/023* (2013.01); *B60B 21/026* (2013.01); *B60B 21/104* (2013.01); *B60B 2900/111* (2013.01); *B60B 2900/50* (2013.01); *B60B 2900/523* (2013.01)

(58) Field of Classification Search
USPC ........................................ 301/95.101, 63.101
See application file for complete search history.

(56) References Cited

U.S. PATENT DOCUMENTS

| | | | |
|---|---|---|---|
| 7,044,562 | B1 | 5/2006 | Drage |
| 2009/0212620 | A1* | 8/2009 | Coleman ................... B60B 3/02 301/63.104 |
| 2009/0273227 | A1 | 11/2009 | Tirado |
| 2010/0096910 | A1* | 4/2010 | Egbert ................. B60B 21/104 301/95.107 |
| 2011/0101770 | A1* | 5/2011 | Brame ................... B60B 3/044 301/95.101 |
| 2012/0286562 | A1 | 11/2012 | Ono |
| 2012/0291283 | A1* | 11/2012 | Ikeda ....................... B60B 3/02 29/894.324 |

FOREIGN PATENT DOCUMENTS

| | | |
|---|---|---|
| DE | 19615675 | 10/1997 |
| DE | 69707041 | 6/2002 |
| DE | 102006039692 | 2/2008 |
| JP | 2000142007 | 5/2000 |
| WO | 0128786 | 4/2001 |
| WO | 2005037573 | 4/2005 |
| WO | 2011089881 | 7/2011 |

OTHER PUBLICATIONS

International Search Report for International Application No. PCT/EP2013/002000 mailed Oct. 8, 2013.

* cited by examiner

VEHICLE WHEEL RIM

CROSS-REFERENCE TO RELATED APPLICATION

This is a U.S. National Phase Application of PCT International Patent Application Number PCT/EP2013/002000, filed Jul. 6, 2013, which claims priority benefit of DE 10 2012 5 107 019.9, filed Aug. 1, 2012, each of which is incorporated herein by reference in its entirety.

FIELD OF THE INVENTION

The invention relates to a vehicle wheel rim, in particular for use on a motor vehicle, having a wheel rim well, an inner wheel rim flange and an outer wheel rim flange, wherein the wheel rim well is delimited at its axial end regions by in each case one of the wheel rim flanges.

BACKGROUND

Nowadays, motor vehicles generally make contact with the ground via vehicle wheels. These wheels consist of a wheel rim and of a tire mounted on the wheel rim.

In general, the motive power of the vehicle is transmitted to the ground exclusively via the wheels. The wheels and the tires and hence also the wheel rims are therefore subjected to large forces.

In order to achieve secure seating of the tire on the wheel rim, wheel rims have a wheel rim flange on the inner flank oriented toward the vehicle and a wheel rim flank on the outer flank oriented away from the vehicle, said wheel rim flanges being intended to prevent the tire from slipping sideways off the wheel rim.

In the prior art, configurations of both the outer wheel rim flange and of the inner wheel rim flange which project outward in a radial direction in order to prevent the tire from slipping off sideways are disclosed. DE 195 33 612 A1 discloses this design.

However, the disadvantage here is that radial deflection of the tire is not effectively prevented by this known design, this being attributable to the radial stiffness of the wheel.

SUMMARY

It is therefore an object of the present invention to provide a vehicle wheel rim having an inner wheel rim flange, which wheel rim allows radial guidance, with maximum stiffness, of the tire on the receiving region of the tire.

An object of the present invention is achieved by a vehicle wheel rim, in particular for use on a motor vehicle, having a wheel rim well, an inner wheel rim flange and an outer wheel rim flange, wherein the wheel rim well is delimited at its axial end regions by in each case one of the wheel rim flanges, wherein the wheel rim flanges are formed by a radially encircling wall, said walls extending in each case at a predefinable angle with respect to the wheel rim well, characterized in that the vehicle wheel rim comprises a C-shaped pocket, wherein the C-shaped pocket is formed at least in part from constituent parts of the wheel rim flange and of the wheel rim well.

An illustrative embodiment of the invention relates to a vehicle wheel rim, in particular for use on a motor vehicle, having a wheel rim well, an inner wheel rim flange and an outer wheel rim flange, wherein the wheel rim well is delimited at its axial end regions by in each case one of the wheel rim flanges, wherein the wheel rim flanges are formed by a radially encircling wall, said walls extending in each case at a predefinable angle with respect to the wheel rim well, and wherein the vehicle wheel rim comprises a C-shaped pocket, which is formed at least in part from constituent parts of the wheel rim flange and of the wheel rim well.

Here, the inner wheel rim flange in each case denotes the wheel rim flange which is arranged on the end of the wheel rim well closer to the vehicle. The wheel rim flange further away from the vehicle is referred to as the outer wheel rim flange.

The wheel rim flanges prevent a tire fitted on the wheel rim from sliding off sideways. The wheel rim flanges furthermore enable the vehicle to be driven with the tire at a high filling pressure, this entailing advantages as regards rolling noise and rolling resistance.

It is also expedient if the angle between the wheel rim well and a section of the inner wheel rim flange which extends away from the wheel rim well, as viewed from the central axis of the wheel rim, is between 45° and 135°, preferably being in a range of between 70° and 120°, preferably in the range of 85° to 105°.

The angle between the wheel rim flange and the wheel rim well is ideally in a range in which the tire can both be mounted easily and also achieves secure seating on the wheel rim. Moreover, an angle is to be preferred which does not lead to the tire being damaged by the wheel rim flange.

A preferred illustrative embodiment is characterized in that the inner wheel rim flange is formed by an upper section, which extends away from the central axis of the wheel rim, starting from the wheel rim well, and by a lower section, which extends in the direction of the central axis, starting from the wheel rim well.

The design described above ensures that the wheel rim well is connected to the wheel rim flange at only one connection point. It is thereby possible to ensure that the wheel rim flange is raised inward toward the center of the wheel rim well by virtue of the forces acting and thus ensures improved seating of the tire on the wheel rim flange. At the same time, it is possible to achieve a lightweight, material-saving construction of the wheel rim by means of the described configuration of the wheel rim flange.

It is furthermore advantageous if the lower section of the inner wheel rim flange is formed by a substantially rectilinear continuation of the upper section, wherein the lower section has a subsection angled in the direction of the center of the wheel rim well.

By designing the wheel rim and, in particular, the wheel rim flange with walls that are as thin as possible and material thicknesses that are as small as possible, it is possible to reduce and thus optimize the overall weight of the wheel rim. At the same time, the design described makes it possible to absorb the occurring forces in an optimum manner. Moreover, the seating of the tire on the wheel rim is improved.

It is furthermore to be preferred if the angled subsection of the lower section of the inner wheel rim flange extends substantially parallel to the wheel rim well and forms a C-shaped pocket with the latter.

This design leads to higher stability of the wheel rim and, in particular, of the wheel rim flange and, at the same time, to a weight which is, as far as possible, optimum.

According to another favorable development, it can be envisaged that, in the region situated adjacent to the inner wheel rim flange, the wheel rim well has a thickened portion of material, which is arranged on the surface of the wheel rim well which faces away from the central axis of the wheel rim.

The thickened portion of material prevents the tire from sliding toward the center of the wheel rim well. This is helpful particularly in driving situations in which large side forces act on the flanks of the tire. The tire is held in position in the wheel rim well between the inner wheel rim flange and the thickened portion of material.

It is furthermore expedient if the region of the wheel rim well between the inner wheel rim flange and the thickened portion of material forms the receiving region for a flank of a tire.

As already described above, a receiving region for a flank of the tire, in which the tire can be positioned securely on the wheel rim, is produced by the thickened portion of material and the wheel rim flange.

In a particularly favorable configuration of the invention, it is furthermore envisaged that the inner wheel rim flange is formed by a section which, starting from the wheel rim well, extends away from the central axis of the wheel rim and is divided at a distance from the wheel rim well into a first leg and a second leg, with the result that the wheel rim flange has a t-shaped cross section.

This configuration represents an alternative embodiment. By virtue of the fact that the wheel rim flange is directed only upward, i.e. away from the central axis of the wheel rim, an additional pocket that could hold dirt and foreign bodies is no longer formed underneath the wheel rim well. Moreover, damage to the pocket due to mechanical influences from the outside is excluded.

It is also to be preferred if the first leg extends substantially parallel to the wheel rim well and forms with the latter a C-shaped pocket, which is arranged on the surface of the wheel rim well which faces away from the central axis of the wheel rim.

The formation of the pocket between the upper side of the wheel rim well and the wheel rim flange leads to the pocket being better protected against dirt and damage since it is inside the tire in the fully assembled state. Nevertheless, the wheel rim flange is still connected to the wheel rim well only by one connection point, which leads to raising of the wheel rim flange owing to the acting forces and hence to more secure seating of the tire on the wheel rim.

It is furthermore advantageous if the second leg extends at a predefinable angle with respect to the section which extends between the wheel rim well and the division of the wheel rim flange into the first leg and the second leg.

By means of the alignment of the second leg, the seating of the tire in the wheel rim well can be further optimized. Depending on the angle chosen, the mounting of the tire is thereby simplified and/or the seating is thereby improved.

It is furthermore expedient if the first leg, which extends substantially parallel to the wheel rim well, has, in a region adjacent to the second leg of the inner wheel rim flange, a thickened portion of material which is oriented away from the central axis of the wheel rim.

This thickened portion of material prevents the tire from sliding toward the center of the wheel rim well.

Another preferred illustrative embodiment is characterized in that the region of the first leg, which extends substantially parallel to the wheel rim well, forms a receiving region for a flank of a tire between the second leg of the inner wheel rim flange and the thickened portion of material.

The receiving region, which is formed between the second leg and the thickened portion of material, improves the seating of the tire in the wheel rim well. The absorption of forces which act laterally on the flank of a tire, in particular, is optimized here.

BRIEF DESCRIPTION OF THE DRAWINGS

The invention is explained in detail below by means of an illustrative embodiment with reference to the drawing, in which.

DETAILED DESCRIPTION

Figure 1:
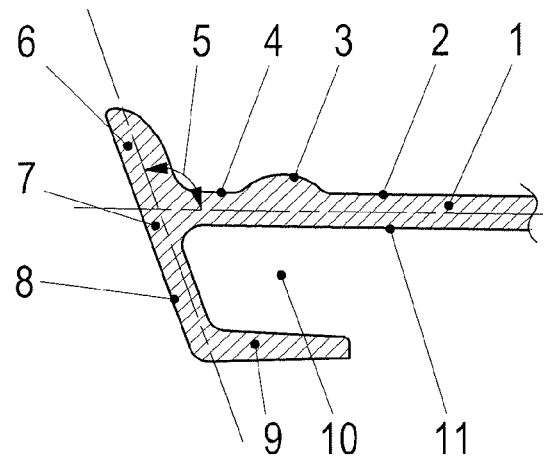
FIG. 1 shows a section, parallel to the central axis of the wheel rim, through an inner wheel rim flange.

FIG. 1 shows a section through the center plane of a wheel rim, along the central axis. It shows a detail view, being the section through a wheel rim well 1 having a wheel rim flange 7 arranged laterally on the wheel rim well 1.

The wheel rim well 1 extends further to the right beyond the subsection illustrated in FIG. 1. Adjoining the figure shown at the bottom is a wheel disk, which can be rotated about the central axis (likewise not shown) of the wheel rim, which extends in the plane of the drawing. The wheel rim is formed essentially from the wheel rim well 1 and the wheel disk.

The wheel rim well 1 consists essentially of an axial extent, which is formed by a wall. Laterally adjoining an end region of said wheel rim well 1 is the wheel rim flange 7. The wheel rim flange 7 shown in FIG. 1 forms the inner wheel rim flange of the wheel rim. Here, the term "the inner wheel rim flange" refers to the wheel rim flange which is arranged on the side of the wheel rim which faces the vehicle.

The wheel rim flange 7 shown in FIG. 1 is formed essentially from two sections 6, 8. The upper section 6 of the wheel rim flange 7 projects at a predefinable angle 5 from the wheel rim well 1. The upper section 6 extends from the surface 2 which represents the surface of the wheel rim well 1 which faces away from the central axis of the wheel rim. The predefinable angle 5 between the wheel rim well 1 and the upper section 6 of the wheel rim flange 7 is somewhat greater than 90° in FIG. 1 and corresponds approximately to an angle of 100°.

In alternative embodiments, the angle 5 can also assume different values but it is advantageously above 90° in order to ensure the action according to the invention of the wheel rim flange. The angle 5 should be chosen according to the respective demand on the wheel rim flange 7.

A thickened portion of material 3 is arranged on the surface 2 of the wheel rim well 1 adjacent to the upper section of the wheel rim flange 7. Together with the upper section 6, this thickened portion of material 3 forms a receiving region 4. This receiving region 4 serves subsequently to receive a flank of a tire.

Here, the thickened portion of material 3 contributes in particular to securing the flank of the tire against slipping to the right toward the center of the wheel rim well 1. This safeguard against slipping sideways has the effect that a tire can absorb higher lateral forces on its flanks without slipping out of its predetermined position.

The upper section 6 of the wheel rim flange 7 serves for the lateral fixing of a tire flank which can be introduced into the receiving region 4. In particular, the upper section 6 prevents the tire flank from slipping sideways off the wheel rim.

Starting from the wheel rim well 1, the wheel rim flange 7 is furthermore continued downward by section 8. Section 8 extends substantially as a rectilinear continuation of the upper section 6. In alternative embodiments, however, it is entirely conceivable to arrange section 8 at an angle with respect to section 6.

Section 8 has an angled subsection 9, which extends substantially parallel to the wheel rim well 1. With its angled subsection 9 and the wheel rim well 1, the lower section 8 thus forms a C-shaped pocket 10, which is arranged on the surface 11 of the wheel rim well 1 which faces the central axis of the wheel rim.

The entire embodiment, illustrated in FIG. 1, of the wheel rim well 1 and of the wheel rim flange 7 is characterized in that all transitions in the shape are formed by radii which are as gentle as possible. The use of sharp edges is very largely avoided in order to avoid introducing disruptive notching effects into the wheel rim well 1 or the wheel rim flange 7, which could have a negative effect on the durability of the entire wheel rim. Moreover, the aim is a thickness of the material which is matched to the occurring loads and is as small as possible in order in this way to produce a wheel rim which is as far as possible optimized in terms of weight.

Figure 2:
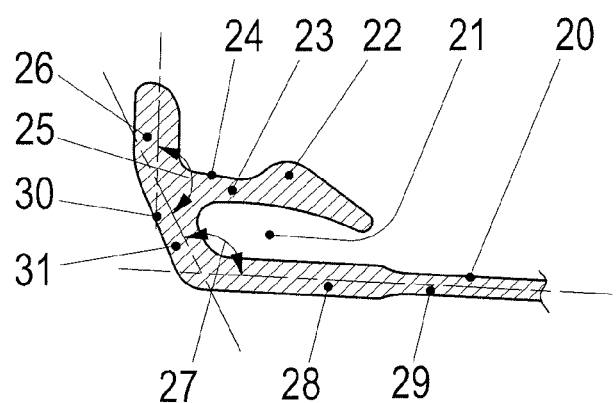
FIG. 2 shows a section, parallel to the central axis of the wheel rim, of an alternative embodiment of an inner wheel rim flange.

FIG. 2 shows an alternative embodiment of a wheel rim well 29. As a departure from FIG. 1, the wheel rim flange 30 is now formed only from sections which are arranged above the wheel rim well 29, on the surface 20 of the wheel rim well 29 which faces away from the central axis.

The wheel rim flange 30 adjoins the wheel rim well 29 laterally. The first section 31 of the wheel rim flange 30 projects upward from the wheel rim well 29. In this arrangement, section 31 is arranged at a predefinable angle 27 with respect to the wheel rim well 29. The lower section 31 is followed by a division of the wheel rim flange 30 into a T-shaped structure, which has a first leg 23 and a second leg 26.

Here, the first leg 23 extends substantially parallel to the wheel rim well 29. The second leg 26 adjoins the lower section 31 of the wheel rim flange 30 at a predefinable angle 25. In the embodiment shown in FIG. 2, the second leg 26 extends approximately at a right angle to the wheel rim well 29.

Adjacent to the second leg 26, the first leg 23 has a thickened portion of material 22. Between this thickened portion of material 22 and the second leg 26, a receiving region 24 is formed, which can subsequently receive the flank of a tire. In this arrangement, the thickened portion of material 22 serves to secure the tire flank against slipping toward the center of the wheel rim. At the same time, the second leg 26 prevents the tire flank from slipping sideways off the wheel rim.

The first leg 23, which extends substantially parallel to the wheel rim well 29, forms a C-shaped pocket between the surface 20 of the wheel rim well 29 that lies on the surface 28 of the wheel rim well 29 which faces away from the central axis and the lower section 31 of the wheel rim flange 30. In contrast to the embodiment shown in FIG. 1, this C-shaped pocket 21 is now arranged on the surface 28 of the wheel rim well 29 which faces away from the central axis of the wheel rim.

In the illustrative embodiment in FIG. 2 too, all the transitions have a radius profile which is as gentle as possible. In the illustrative embodiment in FIG. 2 too, the introduction of sharp edges from which a notching effect can emanate is eliminated.

Figure 3:
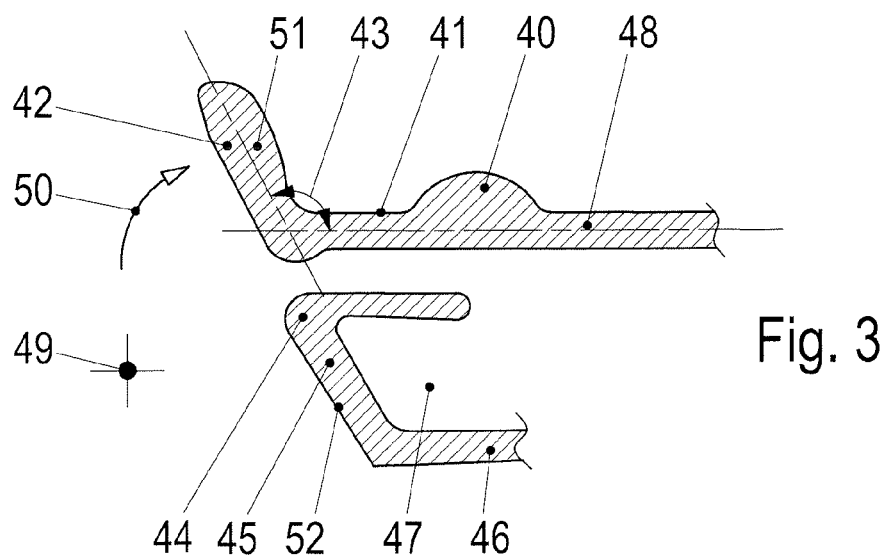
FIG. 3 shows another section, parallel to the central axis of the wheel rim, to illustrate the principle of action.

FIG. 3 shows another schematic illustration of a wheel rim flange 42, which is connected laterally to a wheel rim well 48. A receiving region 41 is likewise formed between the wheel rim flange 42 and a thickened portion of material 40 on the surface of the wheel rim well 48 which faces away from the central axis. Here, the wheel rim flange 42 extends at a predefinable angle 43 with respect to the wheel rim well 48 in a first section 51.

Here too, the receiving region 41 serves to receive the flank of a tire.

In the mounted state, i.e. with a wheel fitted on the wheel rim, forces due inter alia to the air filling of the tire and the weight of the vehicle occur at the wheel rim and the tire and hence also at the wheel rim well 48 and the wheel rim flange 42.

Particularly owing to a radial load which acts in this case, a shear center 49 arises to the left of the wheel rim flange 42, below the wheel rim well 48. The position of the shear center 49 gives rise to a moment 50 which acts upward in a clockwise direction from the outside on the wheel rim flange 42. Owing to this moment 50, the wheel rim flange 42 is subject to a force which bends the wheel rim flange 42 to the right toward the center of the wheel rim well 48 and thereby raises it. The acting moment 50 reduces the angle 43 between the wheel rim well 48 and the wheel rim flange 42.

This gives rise to an effect of the wheel rim flange 42 which is equivalent to a C-shaped profile. A C-shaped profile 45 of this kind is illustrated in the lower part of FIG. 3. It consists of a wheel rim flange 44 which extends through a first section 52 from the indicated wheel rim well 46. The C-shaped design gives rise to a pocket 47 which is formed by the wheel rim flange 44 and the wheel rim well 46.

By virtue of the raising of the wheel rim flanges 7, 30, 42 and the resulting effect similar to that of a C profile 45, the seating of the tire in the receiving regions 4, 24, 41 is improved and, in addition to the prevention of slipping off sideways, radial lifting of the tire is also prevented in an effective manner by the wheel rim flange 7, 30, 42.

FIG. 3 serves merely to illustrate the principle of action and does not form an embodiment according to the invention. It serves to illustrate that a shear center positioned as shown in FIG. 3 causes a force to act on the wheel rim flange 7, 30, 42 which has the effect of raising the wheel rim flange 7, 30, 42.

The invention claimed is:

1. A vehicle wheel rim for use on a motor vehicle, having a wheel rim well, an inner wheel rim flange and an outer wheel rim flange, wherein the wheel rim well is delimited at its axial end regions by in each case one of the wheel rim flanges, wherein the wheel rim flanges are formed by a radially encircling wall, said walls extending in each case at a predefinable angle with respect to the wheel rim well, wherein the vehicle wheel rim comprises a C-shaped pocket, wherein the C-shaped pocket is formed at least in part from constituent parts of the wheel rim flange and of the wheel rim well, wherein, in the region situated adjacent to the inner wheel rim flange, the wheel rim well has a thickened portion of material, which is arranged on the surface of the wheel rim well which faces away from the central axis of the wheel rim, and wherein the region of the wheel rim well between the inner wheel rim flange and the thickened portion of material forms a receiving region for a flank of a tire.

2. The vehicle wheel rim as claimed in claim 1, wherein the inner wheel rim flange is formed by an upper section, which extends away from the central axis of the wheel rim, starting from the wheel rim well, and by a lower section, which extends in the direction of the central axis, starting from the wheel rim well.

3. The vehicle wheel rim as claimed in claim 1, wherein the lower section of the inner wheel rim flange is formed by a substantially rectilinear continuation of the upper section, wherein the lower section has a subsection angled in the direction of the center of the wheel rim well.

4. The vehicle wheel rim as claimed in claim 1, wherein the angled subsection of the lower section of the inner wheel rim flange extends substantially parallel to the wheel rim well and forms the C-shaped pocket with the wheel rim well.

* * * * *